455-611 AU 233 EX

FIP8106 XR 3,214,590

Oct. 26, 1965 M. G. SCHACTMAN 3,214,590

COMMUNICATION RECEIVER UTILIZING NEGATIVE FEEDBACK POLARIZATION MODULATION OF ELECTROMAGNETIC WAVES AND COMMUNICATION SYSTEM INCLUDING SAID RECEIVER

Filed June 28, 1962 2 Sheets-Sheet 1

INVENTOR
M. G. SCHACHTMAN
BY Roy M. Porter Jr.
ATTORNEY

INVENTOR
M. G. SCHACHTMAN
BY Roy M. Porter Jr.
ATTORNEY 3,214,590

COMMUNICATION RECEIVER UTILIZING NEGATIVE FEEDBACK POLARIZATION MODULATION OF ELECTROMAGNETIC WAVES AND COMMUNICATION SYSTEM INCLUDING SAID RECEIVER

Marshall G. Schachtman, Murray Hill, N.J., assignor to Bell Telephone Laboratories, Incorporated, New York, N.Y., a corporation of New York Filed June 28, 1962, Ser. No. 206,041
10 Claims. (Cl. 250—199)

This invention relates to electromagnetic communications systems, and, more particularly to modulators and demodulators for polarized electromagnetic waves.

It has been proposed to construct a narrow-beam wide-band communication system by polarizing the output of a light source, particularly an optical maser, and varying its polarization in accordance with a signal bearing the intelligence to be transmitted. The resulting modulated wave must then be demodulated at the receiver to recover the information.

A linear relationship between the modulating signal used in the transmitter and the output signal of the receiver is necessary in order to recover all of the information originally contained in the modulating signal. However, some systems for demodulating light possessing modulated polarization are severely nonlinear, especially for large degrees of modulation. This problem exists also in systems using a carrier frequency below the optical spectrum when polarization is modulated.

Another related problem is that if the degree of modulation is kept small, spurious electromagnetic disturbances in the transmission medium have a relatively great distorting effect upon the information transmitted. Furthermore, the narrow bandwidth used by a small degree of modulation restricts the rate at which information may be transmitted. Thus, it would be desirable to keep the degree of modulation as large as possible in the transmission medium. Degree of modulation, as used here, refers to the proportion of the energy of the transmitted electromagnetic radiation which bears information.

An additional problem is created by the fact that the available detectors for such receivers, such as photodetectors, produce an objectionable amount of noise, of which the so-called "shot noise" seems particularly resistant to component improvement.

It is an object of this invention to communicate with light waves with negligible loss of information.

Another object of this invention is to achieve a linear relationship between the modulating and demodulated signals in a communications system utilizing electromagnetic waves with modulated polarization, while simultaneously achieving a large degree of modulation in the transmission medium.

Still another object of the invention is to provide a novel receiver for electromagnetic communication systems.

Still another object of the invention is to reduce detector noise in the receiver of an optical communication system.

According to the invention, these and other objects are achieved in a receiver for electromagnetic waves with modulated polarization by feeding back part of the output signals to reduce the degree of modulation of polarization of the waves within the receiver. This feedback is accomplished by receiving the transmitted wave with a device like the device used to modulate the polarization of the wave at the transmitter, and by varying the signal applied to the receiver modulator in accordance with the signal produced at the output of the receiver so that the output signal is reduced in magnitude.

The feedback thus allows a large degree of modulation in the transmission medium in order to reduce the relative effect of spurious disturbances in the transmission medium, while producing a small degree of modulation immediately before the analyzers and photodetectors in order to achieve the needed linearity. The negative feedback also reduces the photodetector noise amplitude at the output.

According to another feature of the invention, the negative feedback is aided in reducing sinusoidal nonlinearity in the receiver by splitting the wave into two components, demodulating the components, and then combining signals resulting from the demodulation of those two components in a push-pull fashion which tends to reduce the nonlinearities.

These and other features of the invention will become apparent from the following detailed description, taken in connection with the accompanying drawings, in which.

Figures 1, 1A, 1B, 1C, 1D, 1E, 1F:
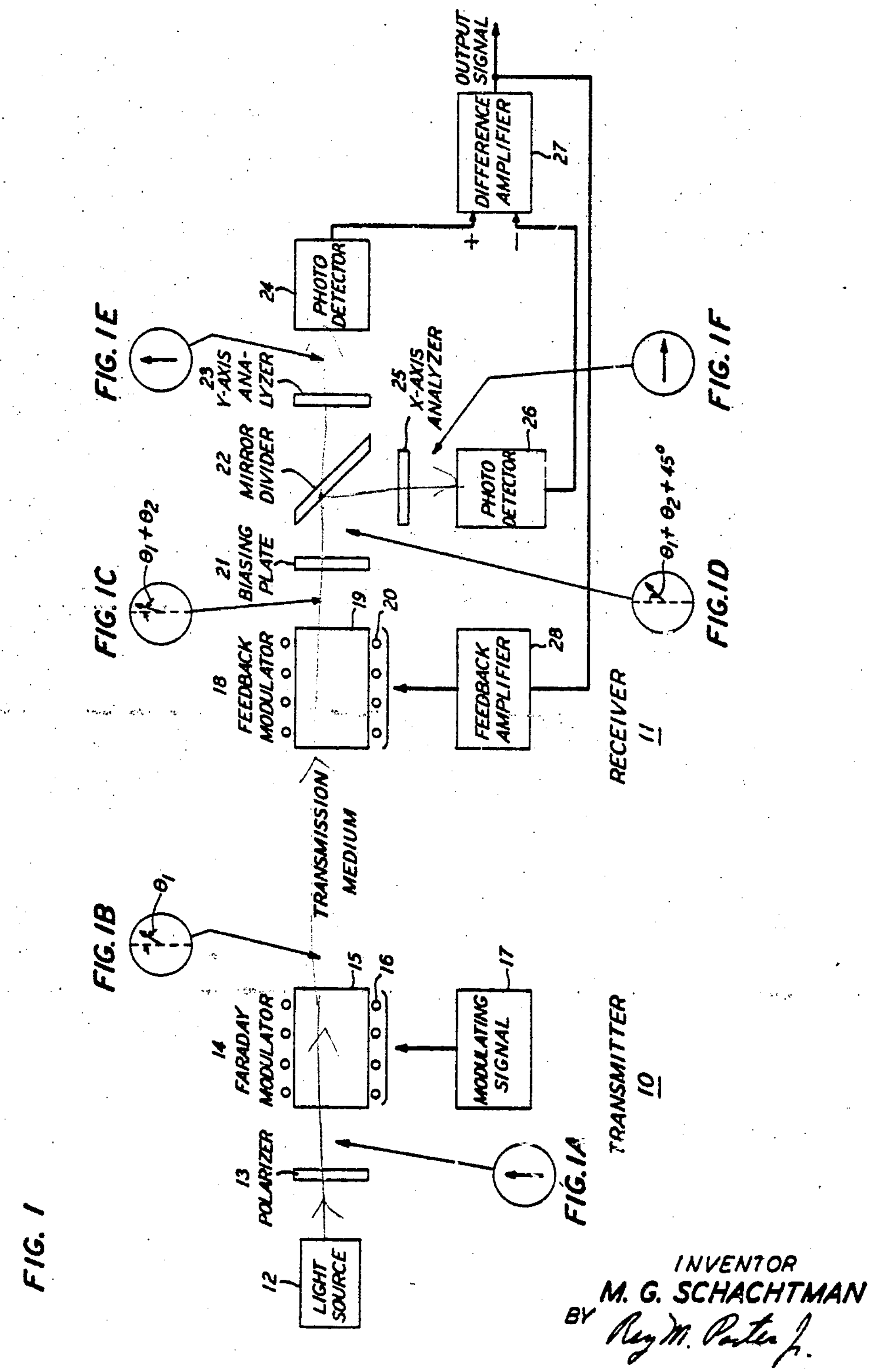
FIG. 1 is a partially pictorial, partially schematic illustration of one preferred embodiment of the invention using a magneto-optic effect.
FIGS. 1A–1F show electromagnetic field vector relationships for the modulated wave at sequential indicated points in the embodiment of FIG. 1.

In transmitter 10, including components 12, 13, 14, 15, 16, and 17 of the communication system depicted in FIG. 1, a beam of light is produced by a light source 12, and then polarized by a plane polarizer 13. Light source 12 may advantageously be an optical maser; but any source of polarized light may perform the functions of source 12 and polarizer 13. For purposes of discussion, the polarization provided by polarizer 13 will be assumed to be along the Y-axis, that is, vertical in the plane of the paper in FIG. 1.

The polarized light beam then passes through a modulator 14 of transmitter 10. Modulator 14 includes a Faraday rotator to which an intelligence signal is applied. Therein, transparent crystal 15 is a material which exhibits an induced tendency to rotate the polarization of light when a magnetic field is applied along the direction of propagation of light through it. The axial magnetic field is illustrated as being applied by a coil 16, which is energized by modulating signal source 17. The amount of rotation of polarization of the light is proportional to the strength of the modulating signal. A particularly advantageous form of modulator 14, which allows modulation at microwave frequencies, is disclosed in the concurrently filed application of J. F. Dillon, Jr., Serial No. 206,102. In that case, coil 16 is replaced by a resonant cavity which creates the axial magnetic field; and the crystal 15 consists of chromium tribromide, for example, and is operated below a temperature of 35° K.

The light beam with varying polarization produced by transmitter 10 now passes through a transmission medium, such as a hollow pipe or outer space, to a receiver 11, comprising components 18 through 28 of FIG. 1.

At the receiver 11 the modulated light beam passes through a feedback modulator 18, which may be structurally quite similar to modulator 14 of transmitter 10. The light beam then passes through biasing plate 21, which is a naturally optically active crystal of the length to give 45° of rotation of the plane of polarization of an incident plane polarized wave. For instance, plate 21 may be a quartz crystal with its optic axis parallel to the direction of propagation of the detailed explanation may be found on pp. 572–577 of Jenkins & White, Fundamentals of Optics, McGraw-Hill, third edition, 1957. In brief, biasing plate 21 of FIG. 1 acts similarly to a Faraday rotator with a fixed bias.

The light beam is then split into two beams by mirror 22, which is effectively half silvered for the angle at which it happens to be placed.

One of the two beams passes through Y-axis analyzer 23, and the other passes through X-axis analyzer 25. Analyzers 23 and 25 are simply polarizers; the significance of the "Y" and "X" designations is that their planes of polarization are mutually perpendicular.

Photodetectors 24 and 26, which follow analyzers 23 and 25 respectively, are well known in the art. They give an output which is proportional to the power of the incident radiation averaged over several cycles of the light frequency, but are able to follow substantially instantaneously the superimposed power variations at a lower frequency, even in the microwave range.

Difference amplifier 27, which subtractively combines the outputs of photodetectors 24 and 26, may be any of a variety of conventional amplifiers adapted to amplify the difference between two currents. Together, components 21–27 are within themselves an improved receiver for waves with modulated polarization; yet they comprise only part of receiver 11.

Feedback amplifier 28 is driven by the output signal of difference amplifier 27, which is also the system output, and, according to the principal feature of the invention, varies the axial magnetic field applied to feedback modulator 18 in the direction which will reduce the system output.

The operation of the embodiment of FIG. 1 may be explained by recalling, as stated above, that the polarization of the light beam at the output of Faraday modulator 14 is rotated through an angle $\theta_1$ proportional to the modulating signal, as illustrated in FIG. 1B. As the modulating signal varies, the polarization swings back and forth. This swing may be made as large as needed to overcome spurious disturbances in the transmission medium. Upon passing through feedback modulator 18, this swing becomes much less as a result of the negative feedback. That is, the polarization of the light is rotated back through an angle $\theta_2$, which may be nearly equal to $-\theta_1$ if no fixed bias is used in feedback modulator 18. In any event, the variable portion of the angle $\theta_2$ will be nearly equal to $-\theta_1$. However, modulation will remain on the carrier wave since $\theta_2$ does not completely cancel out $\theta_1$. This result is illustrated in FIG. 1C.

Biasing plate now rotates the polarization of the wave through an additional fixed angle of 45°. The polarization of the wave will now oscillate about an oblique 45° axis, as illustrated in FIG. 1D. The purpose of this bias is to assure that equal ranges of the variations caused by the modulation in the two separate paths following mirror 22 will exist at the outputs of photodetectors 24 and 26, so that the latter operate in essentially a push-pull manner. Equal ranges of those variations will have the greatest effect in reducing nonlinearities.

To further achieve this general purpose, half-silvered mirror 22 effects a nonfrequency-sensitive, nonpolarization-sensitive power division of the incident wave for the ranges of frequency of interest.

The magnitude of the wave passing through Y-axis analyzer 23 may be seen from FIGS. 1D and 1E to be proportional to $\cos(\theta_1+\theta_2+45°)$. Therefore, the corresponding power incident on photodetector 24 and its output current will be proportional to $\cos^2(\theta_1+\theta_2+45°)$, since the power in an electromagnetic wave is proportional to the square of any one of its vector field intensities. Similarly, as may be determined from FIG. 1D and FIG. 1F and the preceding reasoning, the output current of photodetector 26 will be proportional to $\sin^2(\theta_1+\theta_2+45°)$. By mathematical manipulation, it may be shown that the output of difference amplifier 27, and thus the receiver output, is proportional to $\sin(2\theta_1+2\theta_2)$. Thus, the degree of sinusoidal nonlinearity has been reduced, compared to that obtainable with the use of a single analyzer and photodetector, by the push-pull action of the circuit consisting of biasing plate 21, mirror 22, Y-axis analyzer 23, photodetector 24, X-axis analyzer 25, and photodetector 26.

Furthermore, as the gain of feedback amplifier 28 is increased, $\theta_2$ comes closer to being $-\theta_1$. Consequently, $\sin(2\theta_1+2\theta_2)$ becomes approximately equal to $2\theta_1+2\theta_2$; and the desired linear relationship between the modulating signal from source 17, and the output signal will have been achieved. It will be recalled that $\theta_1$ was proportional to the modulating signal.

The negative feedback, made possible by the introduction of the additional modulator 18 in the receiver 11, has eliminated the severe sinusoidal nonlinearity which would otherwise exist.

Furthermore, the same negative feedback reduces the noise produced by photodetectors 24 and 26. Suppose one of the photodetectors produces a noise pulse which would tend to increase the output signal of difference amplifier 27. Feedback amplifier 28 will then vary the field applied to feedback modulator 18, which in turn rotates the polarization of the light wave to reduce the output signal. As a result, the effect of the noise pulse is counteracted.

The negative feedback not only allows linear operation in what otherwise would be a very nonlinear system, but also combats noise both in the transmission medium and in the receiver 11. A large degree of modulation in the transmission medium, together with a small degree of modulation before photodetectors 24 and 26, is the key to this success.

The substantially distortion-free and noise-free output signal of difference amplifier 27 may now be raised in level in subsequent stages of substantially distortion-free, noise-free amplification.

Figures 2, 2A, 2B, 2C, 2D, 2E, 2F:
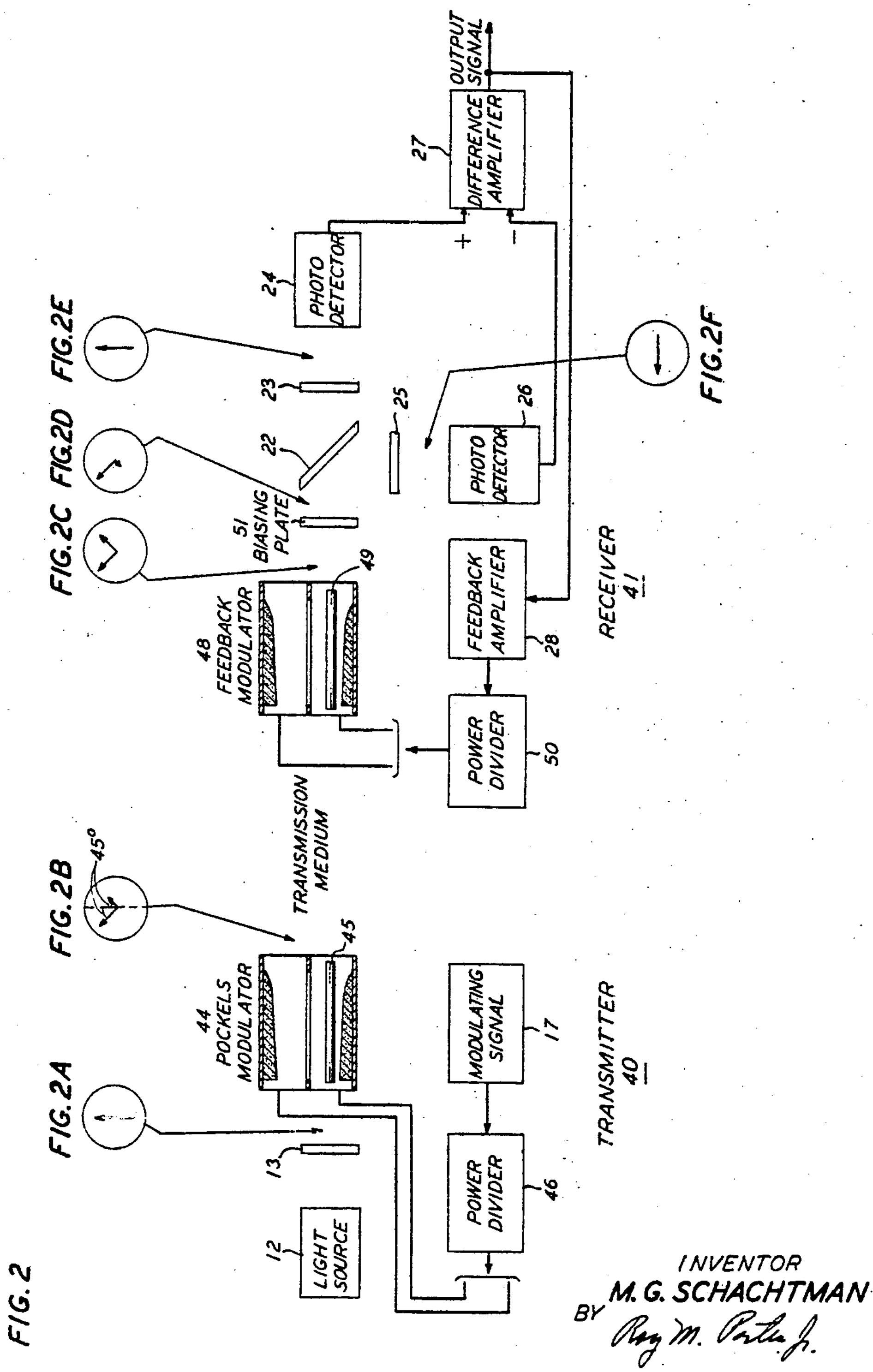
FIG. 2 is a partially pictorial, partially schematic illustration of a second preferred embodiment of the invention, using an electro-optic effect.
FIGS. 2A–2F show electromagnetic field vector relationships for the modulated wave at sequential indicated points in the embodiment of FIG. 2.

The second preferred embodiment of the invention depicted in FIG. 2 performs the same general functions as the embodiment of FIG. 1, although it uses an electro-optic effect known as the Pockels effect for modulating polarization instead of the Faraday magneto-optic effect. That is, the polarization of a light wave is modulated in transmitter 40, the modulation is reduced in receiver 41, the resulting wave is applied to a push-pull detection circuit, and the output is fed back negatively to a modulator 48 within receiver 41 to achieve the aforementioned reduction of modulation.

In transmitter 40, including components 12, 13, 44, 45, 46, and 17, light from a source 12 is polarized by polarizer 13; here, as in FIG. 1 components 12 and 13 represent together a source of polarized light. The polarized light is applied to a modulator 44, which utilizes a variable electric field in the direction of propagation within crystal 45 to vary the polarization of the light wave in response to the modulating signal from source 17. Modulator 44 may advantageously be constructed as disclosed in the copending application of I. P. Kaminow, R. Kompfner, and W. H. Louisell, Serial No. 165,964, filed January 12, 1962, now U.S. Patent No. 3,133,198. The traveling wave operation of such a modulator aids materially in achieving the desired high degree of modulation in the transmission medium.

Power divider 46 is then needed, as explained in the above-cited application of Kaminow et al., in order to apply the modulating signal from source 17 to modulator 44.

Similarly, a power divider 50 is needed in receiver 41 in order to apply the signal from feedback amplifier 28 to modulator 48. Feedback modulator 48 may be structurally the same as modulator 44 of transmitter 40.

Mirror 22, Y-axis analyzer 23, photodetector 24, X-axis analyzer 25, photodetector 26, difference amplifier 27, and feedback amplifier 28 in receiver 41 are similar to the corresponding components of FIG. 1.

Biasing plate 51, however, is different from biasing plate 21 of FIG. 1. Biasing plate 51 is a quarter wave plate and is designed to give a 90° relative phase shift between two mutually perpendicular vector components of a wave, one of which components lies parallel to its optic axis. A more detailed explanation may be found on pp. 556–557 of Jenkins & White, Fundamentals of Optics, McGraw-Hill, *third edition*, 1957. It acts similarly to the way modulators 44 and 48 would act with a fixed bias, as will be seen presently.

Here, as in the case of the analogous components of FIG. 1, components 51 and 22 through 27 are within themselves an improved receiver for waves with modulated polarization.

The principal difference between the operation of the embodiment of FIG. 2 and the operation of the embodiment of FIG. 1 lies in the fact that in FIG. 2 the modulation involves a polarized light wave of varying ellipticity.

In particular, the linearly polarized wave at the output of polarizer 13, shown in FIG. 2A, is treated by modulator 44 as if consisting of two mutually perpendicular vector components each at 45° with respect to the resultant. The relative phase shift between these two components is varied in the following manner. The modulating signal applied to modulator 44 creates a varying axial electric field within crystalline rod 45, which may consist of potassium dihydrogen phosphate or some other dihydrogen phosphate salt as taught in the above-cited application of Kaminow et al. The axial electric field induces an artificial optic axis at a 45° angle with respect to the crystallographic axes of the crystal 45. Proper orientation allows this induced optic axis also to be at a 45° angle with respect to the plane of polarization of polarizer 13.

Now the vector component parallel to the induced optic axis of rod 45 will propagate at a velocity different from the velocity of the component perpendicular to the induced optic axis; and a relative phase shaft, $\delta_1$, proportional to the modulating signal from source 17, will result at the output of modulator 44. As is well known in the art, this type of relative phase shift will result in an elliptically polarized wave. As the modulating signal varies, the ellipticity of the wave at the output of modulator 44 varies. Thus, the polarization of the light wave is modulated. In fact, it may be modulated all the way from a linearly polarized wave in a first direction, to a circularly polarized wave, and beyond a circularly polarized wave to a linearly polarized wave in a second perpendicular direction.

The components of the wave along the 45° axes at the output of modulator 44 are depicted in FIG. 2B. The angle $\delta_1$ is not readily demonstrable therein, although it may be visualized as a phase shift between the wave crests of the components of the wave.

At receiver 41, feedback modulator 48 causes an additional relative phase shift between the 45°-axis components in response to the demodulated signal. The variable part, $\delta_2$, of this additional relative phase shift is nearly equal to the negative of $\delta_1$, resulting in the relationship between the component vectors illustrated in FIG. 2C; that is, they are nearly equal. The proper polarity of feedback is obtained for that polarity which reduces the magnitude of the output signal.

Biasing plate 51 introduces an additional 90° relative phase shift between the 45°-axis components, or such part of the fixed 90° phase shift as is not already introduced in modulator 48, as, for example, by the tilting of receiver 41 with respect to transmitter 40. This can be compensated merely by rotating biasing plate 51.

The object here is to obtain a resultant wave at the output of biasing plate 51 which oscillates around a circularly polarized condition, in order to assure that equal ranges of the variation will exist at the outputs of photodetectors 24 and 26, so that the latter operate in essentially a push-pull manner. Again, equal ranges of these variations will have the greatest effect in reducing nonlinearities.

A nearly circularly polarized wave will result from component vectors in the relationship depicted in FIG. 2D, that is, one component is nearly at its crest when the other is near zero amplitude.

It may be mathematically demonstrated that the output current of photodetector 24 is proporional to $$\cos^2\left[\frac{\delta_1+\delta_2+90^\circ}{2}\right]$$

and that the output current of photodetector 26, which is sensing a vector component of the wave which is mutually perpendicular to that sensed by photodetector 24, as illustrated in FIG. 2E and FIG. 2F, is proportional to $$\sin^2\left[\frac{\delta_1+\delta_2+90^\circ}{2}\right]$$

By mathematical manipulation, it may be shown that the output of difference amplifier 27 and, hence, the output signal of receiver 41, is proportional to $\sin(\delta_1+\delta_2)$. Again the degree of sinusoidal nonlinearity has been reduced by push-pull action.

Furthermore, as the gain of feedback amplifier 28 is increased, $\delta_2$ comes closer to being $-\delta_1$. Consequently, $\sin(\delta_1+\delta_2)$ becomes approximately equal to $\delta_1+\delta_2$; and the desired linear relationship between the modulating signal from source 17 and the output signal of difference amplifier 27 will have been achieved. It will be recalled that $\delta_1$ was proportional to the modulating signal.

It thus appears that so long as the polarization of a wave is modulated in some manner, it is possible to achieve a fairly linear relationship between the modulating signal and the demodulated signal while allowing a large degree of modulation in the transmisison medium by employing negative feedback from the output of the receiver or demodulator to a secondary modulator within the receiver which is similar in operation to the modulator used in the transmitter. Furthermore, it should be apparent that the similarity need exist only in the net results of their respective operations, i.e., in rotation of direction of polarization or variation of ellipticity of polarization.

As in the embodiment of FIG. 1, the negative feedback also reduces noise of photodetectors 24 and 26. The output signal level may now be raised in substantially distortion-free, noise-free stages of amplification.

The principles of the invention are not confined to systems using light waves, but apply to any systems using polarized electromagnetic radiation with modulated polarization.

Another obvious modification of the embodiments of FIG. 1 and FIG. 2 is the modulation of the polarization of the transmitted wave at more than one baseband or modulation frequency by more than one information signal. To separate the signals, receiver 11 must provide detector devices responsive in groups to selected ones of the different baseband frequencies.

Any type of modulating signal may be used with the invention, including AM, FM and PCM, among others.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A communication system comprising a transmitter adapted to produce information responsive time variations of polarization and a receiver including means for altering said time variations means for producing an output signal with amplitudes responsive to said altered time variations, and means for feeding a portion of said output signal to said altering means in a polarity to make said altered time variations smaller than said information responsive time variations.

2. A communication system including a transmitter adapted to produce a polarization modulated electromagnetic wave and a receiver comprising means for reducing the degree of polarization modulation of said wave, said reducing means including polarization modulating apparatus, means for deriving an output signal responsive to said reduced degree of polarization modulation, and means for applying said output signal to said polarization modulating apparatus in negative feedback polarity.

3. A communication system comprising a transmitter including a first polarization modulator and a receiver including a second polarization modulator disposed to intercept an electromagnetic wave from said transmitter, at least one polarizer disposed to intercept said wave after said second polarization modulator, at least one photodetector disposed to intercept an amplitude modulated wave from said polarizer, an output signal circuit connected to said photodetector, and a feedback circuit connected between said output signal circuit and said second polarization modulator in negative feedback arrangement.

4. A communication receiver for producing an output signal from an electromagnetic wave having modulated polarization, comprising means for further modulating the polarization of said wave in response to said receiver output signal to reduce the degree of polarization modulation of said wave, first and second means for analyzing the reduced polarization modulation to derive first and second amplitude modulated waves, said first and second analyzing means having mutually orthogonal planes of polarization, first and second photodetecting means for detecting first and second signals from said first and second amplitude modulated waves, respectively, means for combining said first and second detected signals in subtractive polarity to produce said receiver output signal, and means for biasing said receiver to obtain substantially equal amplitude ranges of said first and second detected signals.

5. A communication receiver according to claim 4 in which the modulating means comprises a polarization modulator capable of affecting the degree of polarization modulation of an intercepted polarization modulated wave having polarization oscillating about a plane, said modulator being coupled in negative feedback arrangement with the combining means, and the biasing means comprises an optically active device disposed to intercept the polarization modulated wave and having an optic axis substantially parallel to the direction of propagation of said intercepted wave, said device being capable of rotating said plane to a position at 45 degree angles with respect to the planes of polarization of the first and second analyzing means.

6. A communication receiver according to claim 4 in which the modulating means comprises a polarization modulator capable of affecting the degree of polarization modulation of an intercepted polarization modulated wave having elliptical polarization oscillating in degree of ellipticity, said modulator being coupled in negative feedback arrangement with the combining means, and the biasing means comprises a device disposed to intercept the polarization modulated wave and having an optic axis oriented parallel to the direction of polarization of one vector component of said intercepted wave for producing a relative phase shift between said one component and another vector component of said intercepted wave that is perpendicular to said one component, said device being capable of varying said oscillating elliptcal polarization to an average condition of substantially circular polarization.

7. A communication system comprising means for transmitting an electromagnetic wave having modulated polarization, said transmitting means including a first modulator arranged and adapted for modulatng said polarization to a first degree in response to an information signal, and means for receiving said wave, said receiving means comprising a second modulator arranged and adapted for modulating said polarization to a second degree that is different from said first degree, means for analyzing said polarization as modulated to said second degree to derive an amplitude modulated wave, means for detecting a receiver output signal in response to said amplitude modulated wave, and means for applying said receiver output signal to said second modulator to make said second degree of modulation less than said first degree of modulation.

8. A communication system according to claim 7 in which the first and second modulators are capable of continuously rotating the plane of polarization of a plane polarized electromagnetic wave.

9. A communication system according to claim 7 in which the first and second modulators are capable of continuously varying the degree of ellipticity of an elliptically polarized wave.

10. A communication system comprising a transmitter and a receiver for an electromagnetic wave having information modulated polarization, said transmitter including a first modulator responsive to an input information signal to modulate said polarization to a first degree, said receiver comprising a second modulator responsive to an output signal of said receiver to modulate said polarization to a second degree that is less than said first degree, first and second polarization analyzers disposed to derive first and second amplitude modulated waves, respectively, from said wave as modulated to said second degree, said first and second analyzers having mutually orthogonal planes of polarization, first and second photodetectors disposed to detect first and second information signals from said first and second amplitude modulated waves, respectively, means for combining said first and second detected signals in a polarity to obtain said receiver output signal substantially linearly related to said input information signal, and means for biasing said receiver to obtain substantially equal amplitude ranges of said first and second amplitude modulated waves and substantially equal amplitude ranges of said first and second detected signals.

References Cited by the Examiner

UNITED STATES PATENTS

| | | | |
|---|---|---|---|
| 1,894,636 | 1/33 | Scheibell | 88—61 |
| 2,064,289 | 12/36 | Cady | 88—61 |
| 2,531,951 | 11/50 | Shamos et al. | 250—199 |
| 2,591,837 | 4/52 | Lee | 250—199 |
| 2,929,922 | 3/60 | Schawlow et al. | 325—26 |
| 2,933,972 | 4/60 | Wenking | 88—14 |

OTHER REFERENCES

Bloembergen et al: Physical Review, vol. 120, No. 6, Dec. 15, 1960, pp. 2014–2023.

DAVID G. REDINBAUGH, *Primary Examiner.*